(12) United States Patent
Kirchhof

(10) Patent No.: US 8,005,575 B2
(45) Date of Patent: Aug. 23, 2011

(54) METHODS AND APPARATUS FOR MODEL PREDICTIVE CONTROL IN A REAL TIME CONTROLLER

(75) Inventor: Darrin Glen Kirchhof, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 1217 days.

(21) Appl. No.: 11/444,637

(22) Filed: Jun. 1, 2006

(65) Prior Publication Data

US 2007/0282487 A1 Dec. 6, 2007

(51) Int. Cl.
G05D 11/00 (2006.01)

(52) U.S. Cl. ............... 700/287; 700/29; 700/33; 700/44

(58) Field of Classification Search .................. 700/287, 700/289, 290, 29, 44, 33
See application file for complete search history.

(56) References Cited

U.S. PATENT DOCUMENTS

| | | | |
|---|---|---|---|
| 4,121,424 A | 10/1978 | Sato et al. | |
| 5,347,446 A | 9/1994 | Iino et al. | |
| 5,477,449 A | 12/1995 | Iino | |
| 5,517,424 A * | 5/1996 | Marcelle et al. | 700/287 |
| 5,519,605 A | 5/1996 | Cawlfield | |
| 5,609,136 A | 3/1997 | Tuken | |
| 5,659,667 A | 8/1997 | Buescher et al. | |
| 5,825,646 A | 10/1998 | Keeler et al. | |
| 6,002,839 A | 12/1999 | Keeler et al. | |
| 6,064,809 A | 5/2000 | Braatz et al. | |
| 6,216,048 B1 | 4/2001 | Keeler et al. | |
| 6,272,882 B1 | 8/2001 | Hodges et al. | |
| 6,276,989 B1 | 8/2001 | Campbell et al. | |
| 6,445,963 B1 | 9/2002 | Blevins et al. | |
| 6,459,939 B1 | 10/2002 | Hugo | |
| 6,594,620 B1 | 7/2003 | Qin et al. | |
| 6,681,155 B1 | 1/2004 | Fujita et al. | |
| 6,718,234 B1 | 4/2004 | Demoro et al. | |
| 6,721,609 B1 * | 4/2004 | Wojsznis et al. | 700/28 |
| 6,725,098 B2 | 4/2004 | Edwards et al. | |
| 6,748,280 B1 | 6/2004 | Zou et al. | |
| 6,823,253 B2 | 11/2004 | Brunell | |
| 6,901,300 B2 | 5/2005 | Blevins et al. | |
| 6,973,508 B2 | 12/2005 | Shepard et al. | |
| 6,980,938 B2 | 12/2005 | Cutler | |
| 6,988,017 B2 | 1/2006 | Pasadyn et al. | |
| 7,050,863 B2 | 5/2006 | Mehta et al. | |
| 2002/0112435 A1 | 8/2002 | Hartman | |
| 2003/0078680 A1 | 4/2003 | Edwards et al. | |
| 2003/0100974 A1 * | 5/2003 | Alvarez et al. | 700/286 |
| 2003/0149493 A1 | 8/2003 | Blevins et al. | |
| 2003/0153988 A1 | 8/2003 | Shepard et al. | |
| 2003/0195665 A1 | 10/2003 | Cutler | |
| 2004/0049295 A1 | 3/2004 | Wojsznis et al. | |
| 2004/0049299 A1 | 3/2004 | Wojsznis et al. | |
| 2004/0088060 A1 | 5/2004 | Renou et al. | |
| 2004/0102890 A1 | 5/2004 | Brunell | |

(Continued)

*Primary Examiner* — Kakali Chaki
*Assistant Examiner* — Nathan Laughlin
(74) *Attorney, Agent, or Firm* — Armstrong Teasdale LLP

(57) ABSTRACT

Methods and apparatus for controlling load on a machine are provided. The method includes determining a maximum value of a process variable using a predictive model of the machine while holding a control output associated with the process variable substantially constant over a prediction period, incrementing the control output if the determined maximum value of the process variable is within an allowable limit range, and setting the control output to the last value of the process variable that did not cause the process value to exceed the allowable range.

16 Claims, 3 Drawing Sheets

U.S. PATENT DOCUMENTS

| | | |
|---|---|---|
| 2004/0103068 A1 | 5/2004 | Eker et al. |
| 2004/0117766 A1 | 6/2004 | Mehta et al. |
| 2004/0162709 A1 | 8/2004 | Das |
| 2004/0249481 A1 | 12/2004 | Zheng et al. |
| 2004/0249483 A1 | 12/2004 | Wojsznis et al. |
| 2004/0255615 A1 | 12/2004 | Hupkes et al. |
| 2004/0267394 A1 | 12/2004 | Kempf et al. |
| 2005/0015122 A1 | 1/2005 | Mott et al. |
| 2005/0015421 A1 | 1/2005 | Fuller |
| 2005/0016704 A1 | 1/2005 | Huhtelin |
| 2005/0107895 A1 | 5/2005 | Pistikopoulos et al. |
| 2005/0149209 A1 | 7/2005 | Wojsznis et al. |
| 2005/0154476 A1 | 7/2005 | Gallestey et al. |
| 2005/0209713 A1 | 9/2005 | Fuller |
| 2005/0221514 A1 | 10/2005 | Pasadyn et al. |
| 2005/0267608 A1 | 12/2005 | Nishira et al. |
| 2006/0015194 A9 | 1/2006 | Zheng et al. |
| 2006/0060684 A1 | 3/2006 | Morrow et al. |

* cited by examiner

METHODS AND APPARATUS FOR MODEL PREDICTIVE CONTROL IN A REAL TIME CONTROLLER

BACKGROUND OF THE INVENTION

This invention relates generally to systems and methods for controlling a process system and more particularly, to implementing model predictive control (MPC) in a real time controller.

Model predictive control typically is used to determine an optimum control output profile based on the results of a model of the process involved. The model predicts the future outcome of control output changes. This technique is particularly useful when the process involved is complex or has a long time constant. One such application is steam turbine rotor stress and axial clearance control. The effects of some control outputs, such as, turbine load on steam turbine rotor stress are not realized for 30 minutes or more. A standard approach to model predictive control involves extensive linear algebraic manipulation. The size of the computing problem is driven by several factors: prediction horizon (time), control step size, and number of model states. The resulting control profile can be complex, changing in value over the prediction horizon as needed to produce an optimal solution. Accordingly, implementing MPC using traditional techniques in existing control systems is not possible due to the large computational effort required.

BRIEF DESCRIPTION OF THE INVENTION

In one embodiment, a method of controlling load on a machine includes determining a maximum value of a process variable using a predictive model of the machine while holding a control output associated with the process variable substantially constant over a prediction period, incrementing the control output if the determined maximum value of the process variable is within an allowable limit range, and setting the control output to the last value of the process variable that did not cause the process value to exceed the allowable range.

In another embodiment, a turbine engine control system includes a plurality of sensors configured to determine a state of the turbine engine, and a processor programmed to determine a maximum value of a process variable using a predictive model of the machine while holding a control output associated with the process variable substantially constant over a prediction period, increment the control output if the determined maximum value of the process variable is within an allowable limit range, and set the control output to the last value of the process variable that did not cause the process value to exceed the allowable range.

In yet another embodiment, a computer program embodied on a computer readable medium for controlling load on a machine is provided. The program includes a code segment that determines a maximum value of a process variable using a predictive model of the machine while holding a control output associated with the process variable substantially constant over a prediction period, increments the control output if the determined maximum value of the process variable is within an allowable limit range, and sets the control output to the last value of the process variable that did not cause the process value to exceed the allowable range.

DETAILED DESCRIPTION OF THE INVENTION

The principal controls available to a shift operator of a steam turbine-generator system include boiler controls which determine the temperature and pressure of the main steam and reheat steam supplies and a main steam admission control valve or valves, which determine the amount of steam admitted to the first or high pressure turbine stage. Practical guidance to an operator of such a steam turbine-generator system includes evaluations of the substantially instantaneous operating parameters in a manner that can be interpreted easily, quickly and without detailed technical analysis to facilitate the manipulation of these principal controls. A technical effect of the present invention is the providing of permissible load guidance during turbine transient operation.

Figure 1:
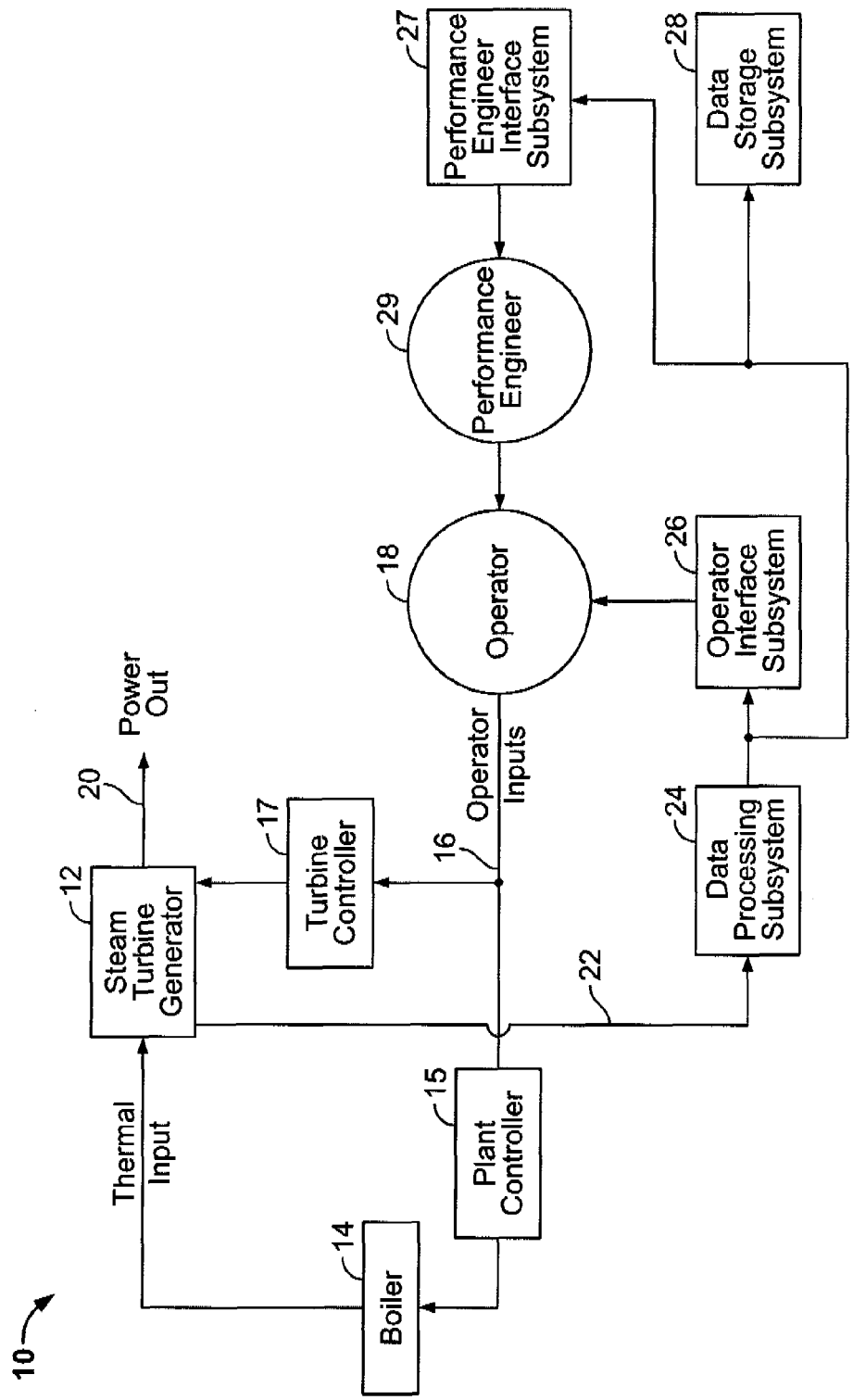
FIG. 1 is a schematic view of an exemplary steam turbine-generator system in accordance with an embodiment of the present invention.

FIG. 1 is a schematic view of an exemplary steam turbine-generator system 10 in accordance with an embodiment of the present invention. Steam turbine-generator system 10 includes a machine, such as a steam turbine-generator 12 receiving a thermal input from a steam boiler 14. Boiler 14 may be of any convenient type, such as a coal-fired, oil-fired, or heat recovery steam generator. Steam turbine-generator 12 is controlled by a turbine controller 17 and boiler 14 is controlled by a plant and real-time controller 15, with operator inputs represented by a line 16 from an operator 18. Turbine controller 17 is configured to control outputs that are transmitted to various control elements associated with steam turbine-generator 12 to control the load of steam turbine-generator 12. Electric power output is produced and represented by a line 20. A set of measured parameters from steam turbine-generator 12 are applied on a line 22 to a data processing subsystem 24. The outputs of a data processing subsystem 24 are transmitted to an operator interface subsystem 26 which may be of a conventional type such as, for example, a cathode ray tube display, a printer or other types of analog or digital display devices. The output from data processing subsystem 24 may also be applied to a data storage subsystem 28 wherein the data may be stored for short-term or long-term purposes. Data storage subsystem 28 may be of any convenient type including a printer. However, in an embodiment used as an example herein, data processing subsystem 24 includes a digital processor and data storage subsystem 28 preferably includes a digital storage device.

Coupled in parallel with operator interface subsystem 26 is a performance engineer interface subsystem 27. Interface 27 allows a performance engineer 29 to study the outputs of data processing subsystem 24 on a more leisurely basis as compared with operator 18. Performance engineer 29 communicates with operator 18 to improve the long-term performance of turbine-generator system 10 due in part to the higher level, sophisticated analysis with which the performance engineer views the data. The performance engineer also determines the maintenance procedures for the system and subsystem 27 assists in the promulgation of those procedures.

Figure 2:
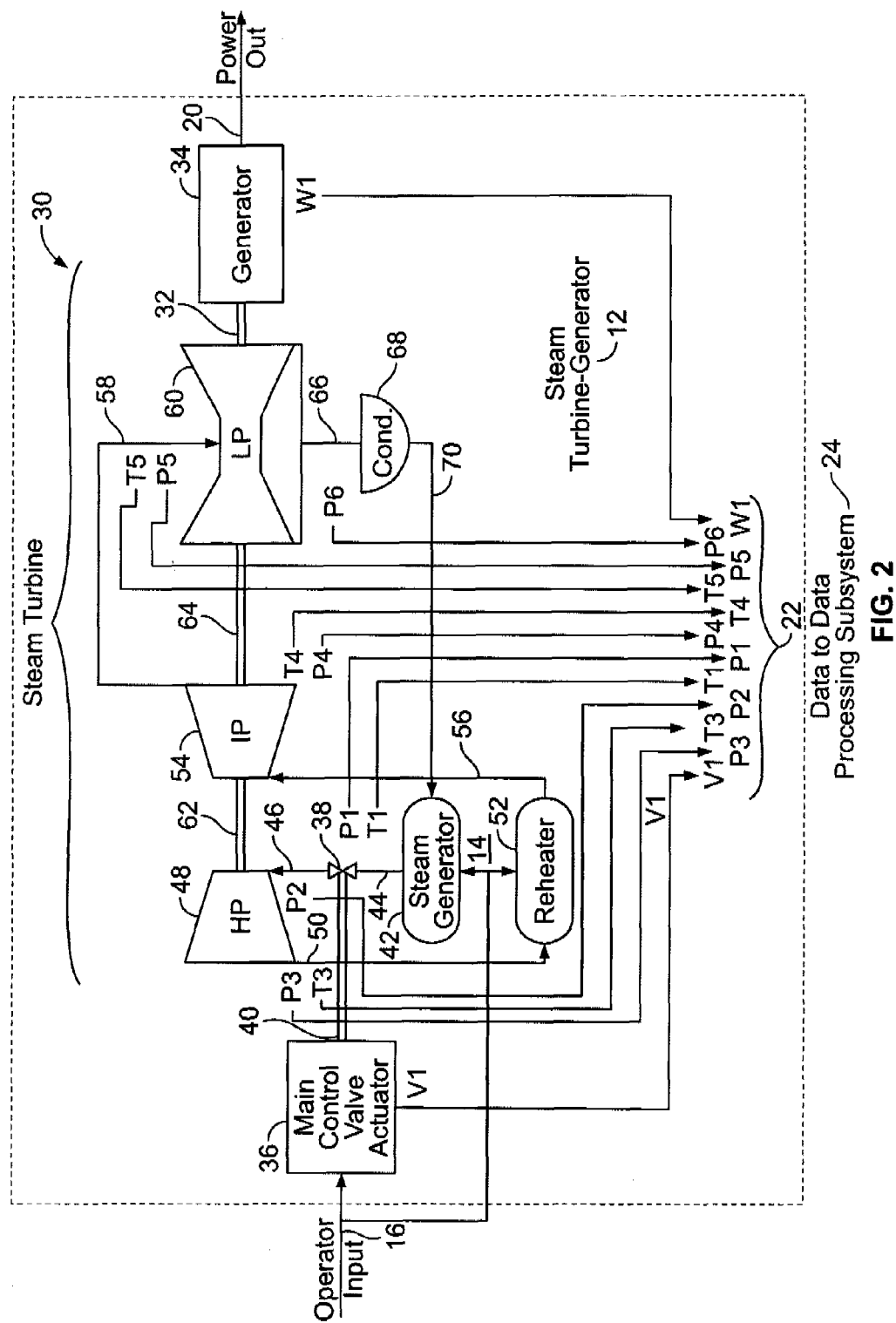
FIG. 2 is a simplified schematic diagram of the steam turbine-generator shown in FIG. 1.

FIG. 2 is a simplified schematic diagram of steam turbine-generator 12 (shown in FIG. 1). Various embodiments of the present invention uses temperature and pressure measurements at various locations throughout steam turbine-generator system 10, including a measurement of the generated electrical power output, and compares their relationship to corresponding design values to determine the power losses, efficiencies and heat rates throughout the system.

Steam turbine-generator 12 includes a steam turbine 30 coupled through a mechanical connection 32, to an electric generator 34 which generates an electric power output. A transducer (not shown) in electric generator 34 produces an electric power output signal W1 which is applied to line 22 for transmission to data processing subsystem 24. The operator input on line 16 is applied by hydraulic, electrohydraulic, digital or other well known means, to a main control valve actuator 36 which affects a main control steam admission valve 38 as illustrated by line 40. A valve position signal V1, is generated by appropriate means and represents the amount by which main control valve 38 is opened, and the signal is applied to line 22 for transmission to data processing subsystem 24. It is to be understood that valve 38 is representative of a number of steam admission control valves commonly associated with a steam turbine.

A steam generator 42, which is part of boiler 14, produces a supply of hot pressurized steam that is applied to main control valve 38 on a line 44. The steam passing through main control valve 38 is applied on a main steam line 46 to an input of a high pressure turbine 48. As utilized herein, the term "HP" refers to high pressure turbine 48. Steam exiting from HP turbine 48, now partially expanded and cooled, but still containing substantial energy, is applied on a cold reheat line 50 to a reheater 52 which is also part of boiler 14. The pressure and temperature of the steam in line 44, upstream of main control valve 38 and generally at its inlet are measured by sensors (not shown) to produce a representative first pressure signal P1 and a first temperature signal T1 which are transmitted to data processing subsystem 24. The pressure and temperature of the steam in cold reheat line 50, downstream of high pressure turbine 48 at substantially its exit, are measured by sensors (not shown) to produce a representative third pressure signal P3 and a third temperature signal T3 which are also transmitted to data processing subsystem 24.

A pressure sensor (not shown) produces a pressure signal P2, representing the pressure sensed proximate the first stage of HP turbine 48, and the signal is transmitted to data processing subsystem 24.

An intermediate pressure turbine 54 (hereinafter "IP" turbine) receives reheated steam from reheater 52 on a hot reheat line 56, expands the steam to extract energy from it and exhausts the steam through an exhaust line 58 to a low pressure turbine 60. Mechanical outputs of HP turbine 48, IP turbine 54 and low pressure turbine 60 (hereinafter "LP" turbine) are interconnected mechanically as shown by coupling means 62 and 64 which are, in turn, mechanically coupled to connection 32 and to the generator 34. A fourth temperature T4 and pressure P4 in hot reheat line 56, upstream of IP turbine 54 are measured by sensors (not shown) and representative signals are transmitted to data processing subsystem 24. In addition, a fifth temperature T5 and pressure P5 of the steam in line 58, downstream of IP turbine 54, is measured by sensors (not shown) and signals representing those quantities are also transmitted to data processing subsystem 24. In another embodiment, T5 and P5 are measured at the low pressure bowl of LP turbine 60.

Exhaust steam from LP turbine 60 is applied on a line 66 to a condenser 68 wherein the steam is condensed to water and thereafter conveyed on a line 70 to steam generator 42 for reuse. One of the factors that can degrade system efficiency is deficient operation of condenser 68 which can result in higher than normal back pressure at the exhaust of low pressure turbine 60. Such back pressure is an indication that the operation of condenser 68 requires adjustment for improved efficiency. A pressure sensor (not shown) in line 66 produces an exhaust pressure signal P6 which is transmitted to data processing subsystem 24 for further processing and display.

It should be noted that the temperature sensors used may be of any convenient type, however, in an embodiment described herein, each temperature sensor includes a plurality of high accuracy chromel constantan (Type E) thermocouples disposed in a well and positioned to give access to the steam whose temperature is to be measured. By using a plurality of thermocouples for each sensor, the results from the plurality of thermocouples may be averaged to substantially reduce individual thermocouple errors or minor differences in system temperatures. In addition, the availability of more than one thermocouple offers a measure of redundancy in case of failure of one or more of the thermocouples at a sensor location. Transmission of the temperature signals may be accomplished using analog voltages or the temperature signals may be digitized before transmission to make the measurements less susceptible to the lengths of cable runs and to noise. Similarly, the pressure sensors may be of any convenient type.

Figure 3:
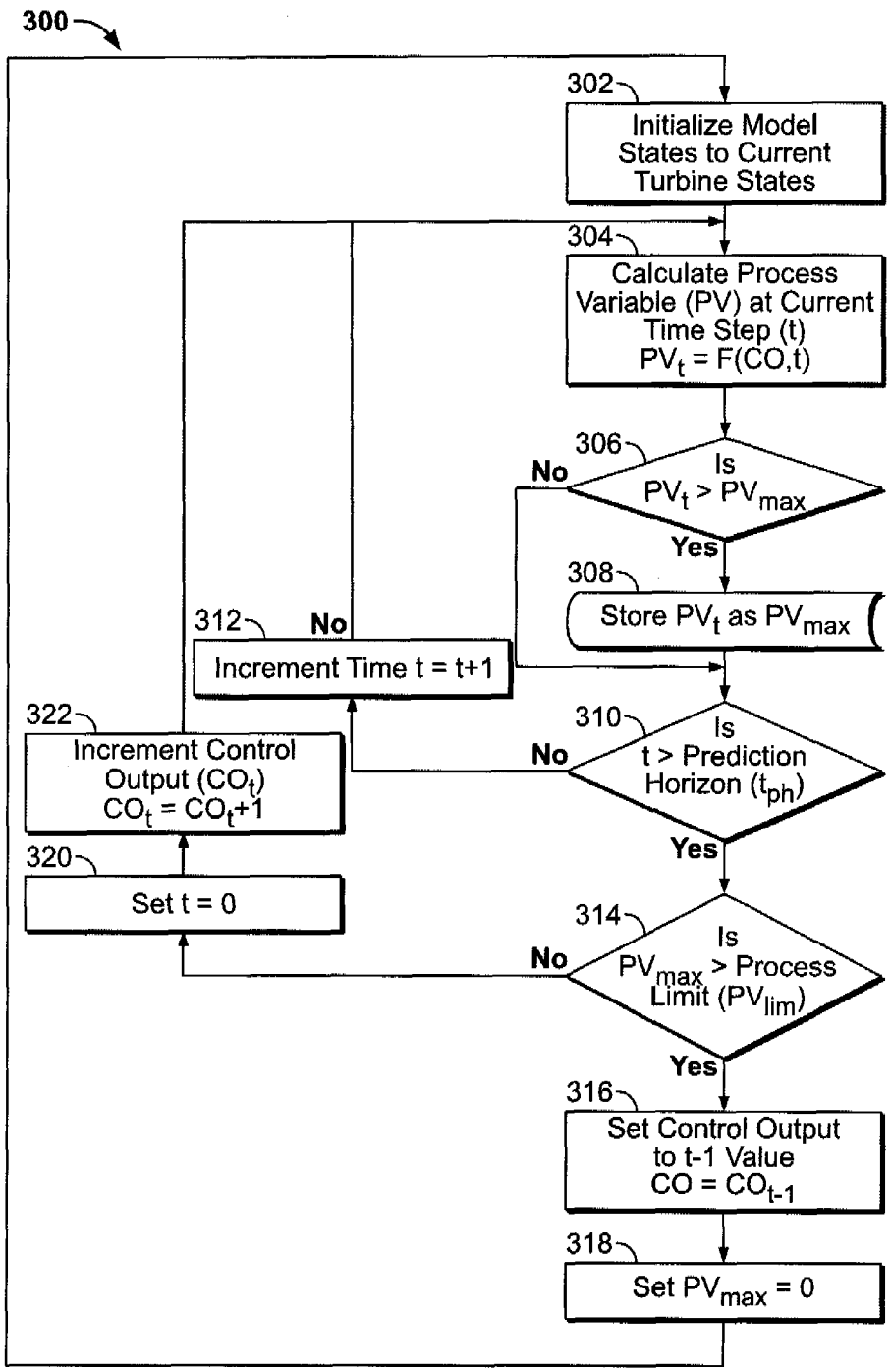
FIG. 3 is a flow chart of an exemplary method of controlling an output of a turbine controller that may be used with the turbine shown in FIG. 2.

FIG. 3 is a flow chart of an exemplary method 300 of controlling an output of a turbine controller that may be used with turbine 30 (shown in FIG. 2). In the exemplary embodiment, method 300 is programmed to execute on a processor associated with turbine 30, such as controller 17. Also programmed into controller 17 is an algorithmic model of system 10 including turbine 30. Method 300 includes initializing 302 the states of the model the current states of turbine 30. For example, the measured parameters input into data processing subsystem 24 through line 22 are used to replace corresponding values in the model such that a time ($t_o$) of the model is the current time with respect to turbine 30. Method 300 iteratively calculates 304 the value of a process variable of interest as a function of a control output that is held constant and time. The current process variable value is compared 306 to the maximum (or minimum) process variable value thus far and if the current process variable value is larger (or smaller) than the maximum (or minimum) process variable value, the maximum (or minimum) process variable value is replaced 308 with the current process variable value. If not, then processing skips step 308 and continues at a step 310, where method 300 checks 310 if the current time increment is greater than the current prediction horizon. If the current time increment is not greater than the prediction horizon, the time is incremented 312 one unit and processing continues at step 304. If the current time exceeds the prediction horizon, method 300 compares 314 the maximum value of the process variable achieved during the prediction horizon timeframe to an allowed maximum limit. In cases where the minimum value of the process variable is of interest, step 314 compares the minimum process variable value found during the prediction horizon to an allowed minimum limit.

If the value of the process variable is determined by the comparison to be outside the limits, the previous value of the control output is set to the output of controller 17 to limit the change of the process variable value to the allowed limit. The maximum value of the process variable is set 318 to zero and the iterative process of method 300 begins again at step 302. If the value of the process variable is determined by the comparison to not be outside the limits at the end of the prediction horizon, the time increment counter is reset 320 to zero time. The control output, which was held constant during the current iteration is incremented 322 and method 300 continues at step 304. Accordingly, method 300 seeks a higher control output that will permit the process variable value to quickly reach predetermined limit for that process variable.

In operation, turbine rotors are typically limited to a predetermined heat-up rate based at least in part on engineering studies of the material of manufacture of the rotor, the configuration of component parts and the response of those parts to changes in temperature and stress. To limit the possibility of exceeding the allowable heat-up rate, operators are typically required to control heat-up rate manually to a rate that is within the predetermined heat-up limit or to heat-up the rotor in steps wherein the rotor can "soak" at the new temperature while temperatures across the rotor equalize. Method 300 permits establishing a control signal that will load the turbine at a relatively faster rate by comparing a response of a model of the turbine to an actual response of the turbine using measured parameters.

As used herein, with reference to a real-time controller, real-time refers to outcomes occurring at a substantially short period after a change in the inputs affecting the outcome. The period is the amount of time between each iteration of a regularly repeated task. Such repeated tasks are called periodic tasks. The time period is a design parameter of the real-time system that may be selected based on the importance of the outcome and/or the capability of the system implementing processing of the inputs to generate the outcome.

As used herein, the term controller may include any processor-based or microprocessor-based system, such as a computer system, that includes microcontrollers, reduced instruction set circuits (RISC), application-specific integrated circuits (ASICs), logic circuits, and any other circuit or processor that is capable of executing the functions described herein. The examples given above are exemplary only, and are not intended to limit in any way the definition and/or meaning of the term controller.

The various embodiments, or the components thereof, may be implemented as a part of the computer system. The computer system may include a computer, an input device, a display unit, and an interface, for example, to access the Internet. It may also include a microprocessor, which may be connected to a communication bus. The computer may include a memory, which may include a Random Access Memory (RAM) and a Read Only Memory (ROM), as well as a storage device, which may be a hard disk drive or a removable storage drive such as a floppy disk drive, an optical disk drive, and so forth. The storage device can also be other similar means of loading computer programs or other instructions into the computer system.

The computer system executes a set of instructions that are stored in one or more storage elements, in order to process input data. The storage elements may also hold data or other information, as desired or required, and may be in the form of an information source or a physical memory element in the processing machine. The set of instructions may include various commands that instruct the computer system to perform specific operations, such as the processes of the various embodiments of the invention. The set of instructions may be in the form of a software program. The software may be in various forms, such as system software or application software. Further, the software may be in the form of a collection of separate programs, a program module within a larger program, or a portion of a program module. The software may also include modular programming in the form of object-oriented programming. The processing of input data by the processing machine may be in response to user commands, to results of previous processing, or to a request made by another processing machine.

As used herein, the terms 'software' and 'firmware' are interchangeable and include any computer program that is stored in the memory, to be executed by a computer, which includes RAM memory, ROM memory, EPROM memory, EEPROM memory, and non-volatile RAM (NVRAM) memory. The memory types mentioned above are only exemplary and do not limit the types of memory used to store computer programs.

The above-described model predictive control method is cost-effective and highly reliable. The method permits outputting a machine loading profile that quickly reaches a hold point that is determined to be the highest possible, followed by a controlled ramp and an early release to full load. Accordingly, the model predictive control method facilitates operation of machines in a cost-effective and reliable manner.

While the invention has been described in terms of various specific embodiments, those skilled in the art will recognize that the invention can be practiced with modification within the spirit and scope of the claims.

What is claimed is:

1. A method of controlling load on a machine using a controller comprising:
   determining at least one of a process variable associated with the machine and a control output associated with the process variable using an iterative process, wherein a value of the process variable is received from a sensor and wherein the control output is output from the controller;
   determining a maximum value of the process variable using a predictive model of the machine while holding the control output substantially constant over a prediction period; and
   incrementing the control output of the controller if the determined maximum value of the process variable is within an allowable limit range; and
   setting the control output of the controller to a last value of the control output determined that did not cause the process value to exceed the allowable range.

2. A method in accordance with claim 1 wherein the predictive model includes a plurality of states, each state relating to at least one associated set of process variables of the machine and wherein said method further comprises initializing a model state to a respective current machine state.

3. A method in accordance with claim 1 wherein determining a maximum value of a process variable comprises iteratively determining a current value of the process variable during the prediction period.

4. A method in accordance with claim 1 wherein determining a maximum value of a process variable comprises comparing a current value of the process variable to the maximum value of the process variable determined during the current prediction period.

5. A method in accordance with claim 1 wherein incrementing the control output comprises comparing the maximum value determined during the current prediction period to a predetermined process variable limit.

6. A method in accordance with claim 1 wherein setting the control output of the controller comprises generating a command to limit a power level of the machine to a level associated with the command.

7. A turbine engine control system comprising:
   a plurality of sensors configured to determine a state of the turbine engine; and
   a processor configured to:
      determine at least one of a process variable associated with the turbine engine and a control output associated with the process variable using an iterative process, wherein a value of the process variable is received from a sensor and the wherein control output is output from said processor;

determine a maximum value of the process variable using a predictive model of the turbine engine while holding the control output substantially constant over a prediction period; and increment the control output if the determined maximum value of the process variable is within an allowable limit range; and set the control output to a last value of the control output determined that did not cause the process value to exceed the allowable range.

8. A system in accordance with claim 7 wherein said processor is further configured to initialize a model state to a respective current machine state.

9. A system in accordance with claim 7 wherein said processor is further configured to iteratively determine a current value of the process variable during the prediction period.

10. A system in accordance with claim 7 wherein said processor is further configured to compare a current value of the process variable to the maximum value of the process variable determined during the current prediction period.

11. A system in accordance with claim 7 wherein said processor is further configured to compare the maximum value determined during the current prediction period to a predetermined process variable limit.

12. A system in accordance with claim 7 wherein said processor is further configured to generate a command to limit a power level of the turbine engine to a level associated with the command.

13. A method for controlling load on a steam turbine generator based on a model of the steam turbine generator executing on a processor, said method comprising:

determining an initial state of the steam turbine generator model using an output of at least one of a plurality of sensors coupled to the steam turbine generator, wherein the state of the steam turbine generator is defined by a plurality of process variables associated with an output of a respective sensor;

predicting a future state of the steam turbine generator model based on a change of a control signal that is input to and output from the model;

wherein predicting a future state of the steam turbine generator model comprises maintaining the control signal input at a substantially constant value during the prediction period;

determining a maximum value of at least one of the process variables during a current prediction period;

comparing the future state of the steam turbine generator to at least one of the determined maximum value and a predetermined range for at least one of the plurality of process variables defining the future state;

iteratively incrementing the control signal input until at least one of the process variables associated with a next future state exceeds at least one of the determined maximum value and the predetermined range for that process parameter value; and setting a control signal output for the steam turbine generator to a last value that did not cause the process variables of the future state to exceed at least one of the determined maximum value and the allowable range.

14. A method in accordance with claim 13 wherein predicting a future state of the steam turbine generator model comprises predicting a future state of the steam turbine generator model during a predetermined prediction time period.

15. A method in accordance with claim 13 further comprising comparing the maximum value of the process variable determined during the current prediction period to a predetermined process variable range.

16. A method in accordance with claim 13 further comprising:

generating a command to limit a power level of the steam turbine generator to a level associated with the command.

* * * * *